United States Patent [19]

Sanders

[11] 4,213,705
[45] Jul. 22, 1980

[54] FOUR MODE ZEEMAN LASER GYROSCOPE WITH MINIMUM HOLE BURNING COMPETITION

[75] Inventor: Virgil E. Sanders, Newberry Park, Calif.

[73] Assignee: Litton Systems, Inc., Beverly Hills, Calif.

[21] Appl. No.: 959,237

[22] Filed: Nov. 9, 1978

Related U.S. Application Data

[63] Continuation-in-part of Ser. No. 798,240, May 18, 1977, abandoned.

[51] Int. Cl.² ........................... G01B 9/02; G01P 9/00
[52] U.S. Cl. ................................................. 356/350
[58] Field of Search ............................. 356/350, 351

[56] References Cited

U.S. PATENT DOCUMENTS

| 3,973,851 | 8/1976 | Ferrar | 356/350 |
| 4,006,989 | 2/1977 | Andringa | 356/350 |

*Primary Examiner*—Vincent P. McGraw
*Attorney, Agent, or Firm*—Roy L. Brown; Harold E. Gillmann; Walter R. Thiel

[57] ABSTRACT

A ring laser gyroscope system is provided in which four frequencies of oscillation are allowed to simultaneously propagate within the ring laser cavity, with two modes propagating in each direction. Separation of the resonant frequencies is accomplished through reciprocal, nonreciprocal, and anisotropic optical effects within the laser path, plus Zeeman effect produced by a magnetic field in a predetermined intensity range over the laser gain plasma. The magnetic field substantially parallel to the laser path over the gain medium reduces the effects of hole burning or source depletion when the amplitudes of the field is within a predetermined intensity range to allow frequencies of the four modes to be spaced closer together. The system employs cavity length control circuitry to optimize system output. Rotation of the system results in frequency changes which are detected and processed to yield inertial rotation information.

15 Claims, 21 Drawing Figures

Fig_1

Fig_2

Fig_3

FIG. 9
PRIOR ART
ACCEPTABLE FREQUENCY SPACING

FIG. 5
PRIOR ART
UNACCEPTABLE FREQUENCY SPACING

FOUR MODE ZEEMAN LASER GYROSCOPE WITH MINIMUM HOLE BURNING COMPETITION

BACKGROUND OF THE INVENTION

This is a continuation in part of copending United States patent application, Ser. No. 798,240, filed May 18, 1977, By Virgil Eugene Sanders for a "Four Mode Ring Laser Gyroscope", now abandoned, which was assigned to Litton Systems, Inc.

FIELD OF THE INVENTION

This invention relates to ring lasers usable as gyroscopes where the difference between resonant frequencies of counterrotating light beams is a measurement of rotation of the laser body. More specifically, this invention has to do with lasers of the four mode type.

Ring laser gyroscopes utilizing counterrotating (i.e. counterpropagating) light beams are weel-known. An example is given in U.S. Pat. No. 4,006,989 which issued Feb. 8, 1977 to K. Andringa for a "Laser Gyroscope." These devices are used for measuring rotation rates about an axis perpendicular to the plane of the ring laser resonant cavity by detecting the beat frequency which occurs due to a frequency difference between the counterrotating beams resulting from the rotation. However, for the ring laser gyroscopes to function at low rates of rotation, frequency locking or lock-in must be overcome. This phenomenon occurs when two traveling waves propagating in opposite directions in a resonant cavity at slightly different frequencies are pulled toward each other to combine in a single frequency standing wave. To avoid lock-in, the frequencies of the counterrotating waves must be sufficiently separated in frequency such that the pulling together does not occur. The effects of lock-in are described in detail in Laser Applications, edited by Monte Ross, Academic Press, Inc., New York, N.Y. 1971, pp. 141 to 143.

The terms "light waves" or light beams," as used herein, are not limited to only radiant energy waves with wavelengths in the visible range.

One of the ways which has been proposed for eliminating lock-in in the ring laser resonant cavity is to have two pairs of counterrotating (counterpropagating) oppositely circularly polarized beams propagating in the cavity simultaneously. One pair consists of right circularly polarized light waves propagating in the clockwise and counterclockwise directions. The other pair consists of left circularly polarized waves which are also propagating in the clockwise and counterclockwise directions within the same resonant cavity. Such a four mode ring laser gyroscope configuration is described in detail in U.S. Pat. No. 3,741,657, issued June 26, 1973, entitled "Laser Gyroscope" by Keimpe Andringa. Operation of a four mode laser gyroscope is briefly described below.

Disposed in the laser path of the propagating waves within the cavity are reciprocally anisotropic and nonreciprocally anisotropic dispersive elements. A reciprocally anisotropic dispersive element, such as an optical rotator made of crystal quartz, provides different delays or different optical indices to right and left circularly polarized waves. This difference in optical index due to sense of polarization is known as natural optical activity and results in an optical path length difference between oppositely polarized waves resonating within the same cavity. The nonreciprocally anisotropic dispersive elements, such as a Faraday cell, presents different optical indices for light waves traveling in opposite directions such that waves traveling in the counterclockwise and clockwise directions have different delays. This difference in delays produces different path lengths for light waves traveling in opposite directions. Therefore, the combination of the two types of anisotropy can be adjusted in frequency separation between resonant modes, such that all four modes resonate at different frequencies.

Separation between the resonant mode frequencies is accomplished so that the resonant frequencies of the two waves traveling in one direction are spaced between the resonant frequencies of the two waves traveling in the opposite direction. The two highest frequency modes have the same sense of polarization but opposite directions of propagation. Likewise, the two lowest frequency modes have the same sense of polarization, opposite from the sense of polarization of the other pair, and they are also counterrotating. Each pair of like-polarized modes operates as a separate two mode laser gyro. As the ring laser system is rotated about an axis perpendicular to the plane of the propagating waves, the frequency separation between the two higher frequency modes will either decrease or increase while the frequency separation between the two lower frequency modes will be oppositely affected; that is, either increase or decrease. The output beat signal resulting from combining the two lower frequency modes is subtracted from the output beat signal resulting from combining the two higher frequency modes. This produces a substantially linear representation or measure of the rotation and rotation rate of the laser system. Further, the direction or rotation is determined by monitoring one of the pairs of modes.

Because of the phenomenon known as "hole burning" the four frequencies of the four resonating modes in the cavity, in the prior art, must be substantially separated. The concept of hole burning involves the population depletion of available light emitting atoms in the gas laser medium which can emit radiant light waves at a given frequency. A laser beam sustained in a laser cavity through stimulated emission depletes the population of available light emitting atoms about the frequency and thereby results in a dip or "hole" in the laser gain vs atom velocity curve. This hole has a certain width such that if two separate beams are operating on atom velocities very close to each other the holes overlap. As a result one of the resonant modes depletes the available atoms and will dominate the intensity of the mode operating at the adjacent frequency which will be substantially reduced or eliminated. Hole burning is explained in detail in the text *Gas Laser Technology by Doublas C. Sinclair and W. Earle Bell, Holt Reinhart and Winston, Inc. New York, N.Y.* 1969, pp. 33-35.

Accordingly, in order to sustain all four resonating modes in the laser cavity, the frequencies of the four modes must be sufficiently separated to prevent the effects of hole burning competition. The frequency spacing must be such that there is no significant overlap between the hole burned or depleted by each resonating mode in the gain curves.

Reciprocal anisotropy is usually accomplished with a quartz crystal disposed in the laser beam path. To provide sufficient dispersion to avoid hole burning effects between the different propagating waves, in the prior art the crystal must be undesirably large. Its size contributes to thermal stresses which occur due to thermal gradients and temperature changes in the laser system and differences between coefficients of expansion of the crystal and the laser body. These stresses increase linear birefringence in the crystal, which increases coupling between different modes. Coupling here is an interaction between different waves traveling in the same direction which produces an error in the output of the laser gyro.

Typically, reciprocal and nonreciprocal anisotropy are achieved in the same element. A Faraday cell can be created by winding an electrical coil around the crystal and passing a d-c current through the coil. The amount of nonreciprocal anisotropy occurring in the cell is determined by the length of the cell, the magnitude of the magnetic field, and the Verdet constant of the crystal material. A Verdet constant is defined as rotation per unit length per unit magnetic field strength. It is a material property such that different materials will have different Verdet constants associated with them.

For purposes of thermal stresses, the crystal is undesirable large. Its length, however, is very small for purposes of a Faraday cell. To achieve the required nonreciprocal anisotropy, the prior art magnetic field over the short length of the crystal must be relatively large, typically over 1000 Gauss. Such high field intensity is difficult to control over the short length of the crystal element.

The purpose of this invention include reduction in length of the crystal rotator and the use of the gain plasma sections as a Faraday rotator with a greatly reduced field intensity.

U.S. Pat. No. 3,973,851 issued Aug. 10, 1976 to C. M. Ferrar for a "Dispersion Compensated Laser Gyro." The apparatus of that patent uses a magnetic field applied to laser gain medium to produce a Zeeman effect. The amount of field is very small, on the order of one Gauss, and it is insufficient to produce the results of the apparatus of this invention. The purpose of the Zeeman splitting in the U.S. Pat. No. 3,973,851 is to produce two gain curves wherein the peaks of the two gain curves are at substantially the same frequencies as the nonreciprocally anisotropically separated frequencies caused by, for example, Faraday rotation. (The patent calls it "rotational bias"). A large crystal is still needed for adequate natural optical activity splitting, and a large magnetic field, perhaps 1000 Gauss is needed on the crystal or other Faraday section to produce the required nonreciprocal anisotropic frequency dispersion.

SUMMARY OF THE INVENTION

In accordance with the invention, the foregoing objects are achieved through the utilization of the Zeeman effect; i.e., imposition of a magnetic field parallel to the laser path over the laser gain medium. This magnetic field causes frequencies of light from the emitting atoms in the gain plasma to be shifted and divided into two groups such that the frequency of each atom is either increased or decreased. Further, these atoms are aligned so that all those shifted up (increased) in frequency by the Zeeman effect may emit light of one polarization in one direction and the opposite polarization in the opposite direction. Those atoms shifted down (decreased) in frequency by the Zeeman effect are affected the same except that the sense of polarization is reversed for a given direction of emission.

In accordance with the invention, the gain curve for a given atom isotope in the laser gain plasma will be divided into two gain curves, separated in frequency within a range such that for one sense of polarization, hole burning or source depletion resulting from a light wave resonating in one direction in the laser cavity will not affect the gain curve for light waves of the same sense of polarization propagating in the opposite direction. In the case of a dual isotope laser gain plasma, the Zeeman effect results in four gain curves. This Zeeman splitting, within limits, of the gain curves substantially increases the independence of the individual modes with respect to the effects of hole burning in the gain medium. This minimization of the effects of hole burning permits a substantial reduction in the separation between the mean frequency of the two modes of one sense of polarization from the mean frequency of the modes of opposite polarization.

Accordingly, the reciprocally anisotropic dispersive element which accomplishes separation between right and left circular polarized light in the ring laser path may be substantially reduced in size and thereby reduce thermal and stress effects caused by temperature changes or temperature gradients in the laser body.

Further in accordance with the invention, the magnetic field imposed over the light source (the laser gain plasma) may also act as a nonreciprocally anisotropic dispersive element (Faraday cell). Because of the different Verdet constants and increased lengths associated with the gain plasma, the same amount of Faraday splitting may be achieved as with prior art four mode gyros of the type described in U.S. Pat. Nos. 3,741,657 and 4,006,989, but with substantially reduced magnetic field intensity.

It is a further object of this invention to use a small natural optical activity splitter and a magnetic field of predetermined magnitude within a predetermined range of magnitudes applied to the gain media of the laser to produce an anisotropic effect and a Zeeman effect of sufficient amplitudes to separate mode frequencies enough to support four modes of oscillation with two isotopes of gas as the gain medium.

Other objects, features and advantages of the invention will become apparent in consideration of the following detailed description and from the attaching drawings.

DETAILED DESCRIPTION OF THE INVENTION

Figure 1:
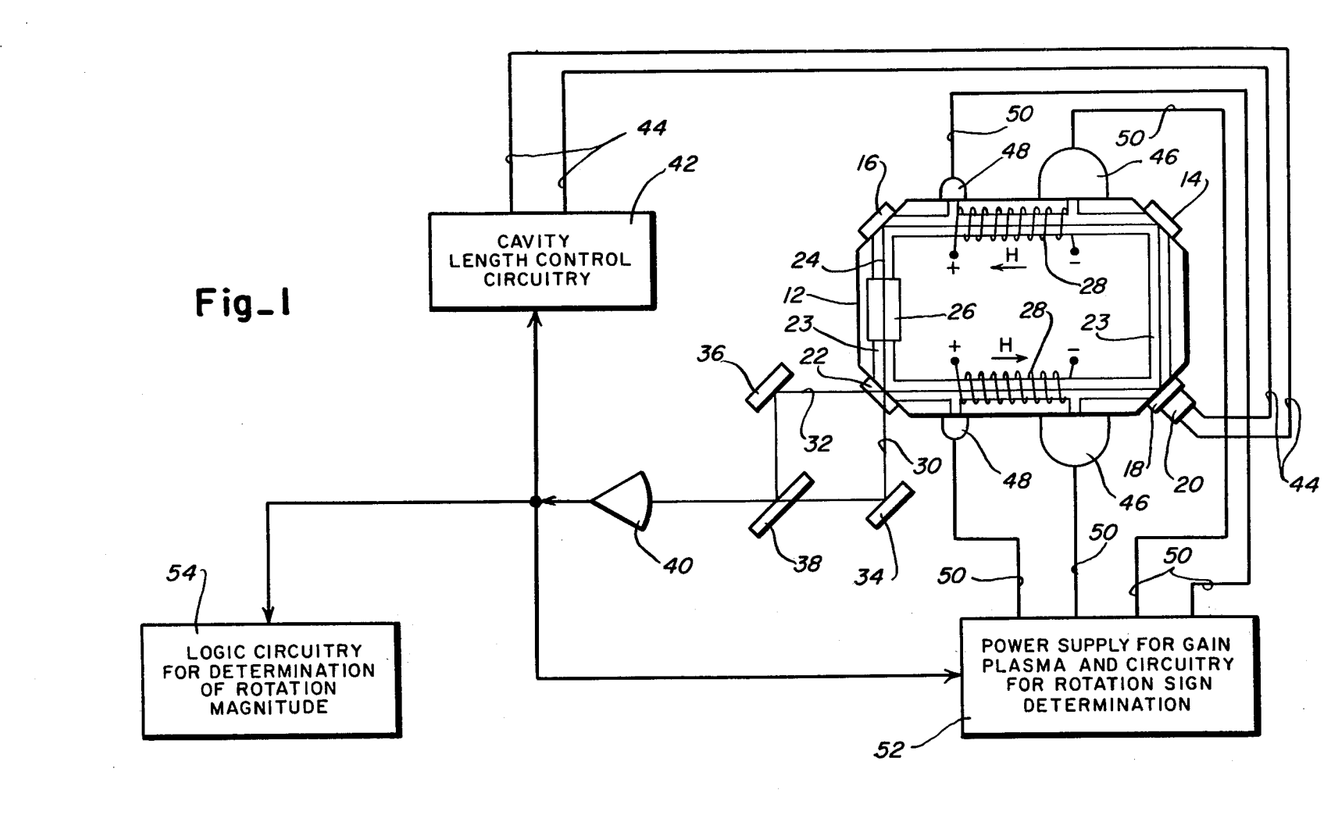
FIG. 1 is a schematic drawing showing the multi-oscillator gyroscope and a block diagram of the circuitry to process the information generated in accordance with the invention

With reference to FIG. 1, the four mode ring laser gyro includes a laser body 12 with a sealed resonant laser cavity 23. The cavity 23 in this case provides a rectangular resonant path with mirrors 14, 16, 18, and 20 at its four corners. The sealed cavity 23 is filled with a dual isotope gain medium such as a helium-neon gas mixture where isotopes of neon 20 and neon 22 are the two active isotopes. In the two portions of the cavity 23 between the cathodes 46 and anodes 48 where the gas is electrically excited, it becomes a light emitting laser gain medium or plasma to sustain the resonant laser waves.

Mirrors 14 and 16 are used solely for reflecting the beams in the laser path 24. Mirror 18 is attached to a piezoelectric element 20 which moves the mirror in and out as part of the cavity length control system. Mirror 22 is only partially reflective thereby allowing a small portion of the waves incident on its surface to pass through the mirror and be combined and processed to provide rotational information. Line 24 represents the ring laser path containing the four modes of circularly polarized light.

The ring laser gyroscope is equipped with a reciprocally anisotropic dispersive element 26. Natural optical activity which occurs within element 26 upon the circularly polarized light is well-known in the art and may be accomplished with a material such as quartz crystal oriented so that the light waves travel along its optic axis. Elements 28 are electric coils with a d-c current applied which provide a magnetic field over the plasma gain sections between cathodes 46 and anodes 48. Coils 28 are wound around the entire sections between the cathodes and anodes to provide a magnetic field over substantially the entire gas plasma light source. The magnetic fields of coils 28 are typically about 100 Gauss.

Imposition of the magnetic field over the laser path may provide Faraday rotation effect, or nonreciprocally anisotropic dispersion, between the clockwise and counterclockwise rotating beams. Also, the field superposed over the excited plasma provides Zeeman frequency splitting between the light emitting atoms in the plasma such that hole burning effects in the gain curves for right and left circularly polarized light will be substantially reduced when the lasing frequencies are close together. The Zeeman effect is thoroughly explained in the text *Fundamentals of Optics* by Francis A. Jenkins and Harvey E. White, McGraw-Hill, New York, N.Y. 1957, pages 588 through 595.

Line 30 represents that portion of the counterclockwise beams in the multi-oscillator system which are allowed to pass through partially reflective mirror 22. They strike mirror 34 and are reflected through beam splitter 38 onto a single photo diode 40. Line 32 represents that portion of the clockwise beams in the system which pass through mirror 22 and strike mirror 36 where they are deflected to beam splitter 38 and made approximately colinear with line 30. The four beams simultaneously striking photodiode 40 generate several beat frequencies due to the difference in frequency between all of the individual beams.

The best frequencies between all of the four modes oscillating in the cavity are detected in the photodiode 40 as described in my copending patent application entitled "Multi-oscillator Ring Laser Gyro Output Information Processing Method," Ser. No. 766,986, filed Feb. 9, 1977, now U.S. Pat. No. 4,123,162 which issued Oct. 31, 1978. The information generated from the beat frequencies between the four oscillating modes is used for determination of the magnitude of the rotation of the ring laser system as well as cavity length control and determination of the direction. A detailed description of how this information is used for the above purposes is provided in the referenced patent application.

Cavity length control circuitry 42 provides an AC signal along leads 44 to the piezoelectric element 20. This AC signal moves mirror 18 in and out resulting in variation of the cavity length of the ring laser. This varies the output of the ring laser system in 40 at the same frequency as the AC component in leads 44 and thereby provides feedback to the cavity length control circuitry 42. This feedback is processed as described in my above referenced copending application to control the DC component along leads 44 to optimize the length of the ring laser cavity for maximum output.

Cathodes 46 and anodes 48 are attached to a power supply 52 along leads 50. The cathodes and anodes provide an electrical field over the gas laser plasma in element 28 sufficient to maintain stimulated light emission from the gas atoms to sustain the propagating laser waves. Voltage across cathodes 46 and anodes 48 is oscillated at a constant frequency in the power supply 52 to vary the output generated in photodiode 40. This output variation is processed in circuitry 52 for determination of the direction of rotation of the gyro system in accordance with my previously referenced copending patent application. Output from photodiode 40 is also fed to logic circuitry 54 for determination of the magnitude of rotation of the ring laser as thoroughly discussed in the same patent application.

Figure 2:
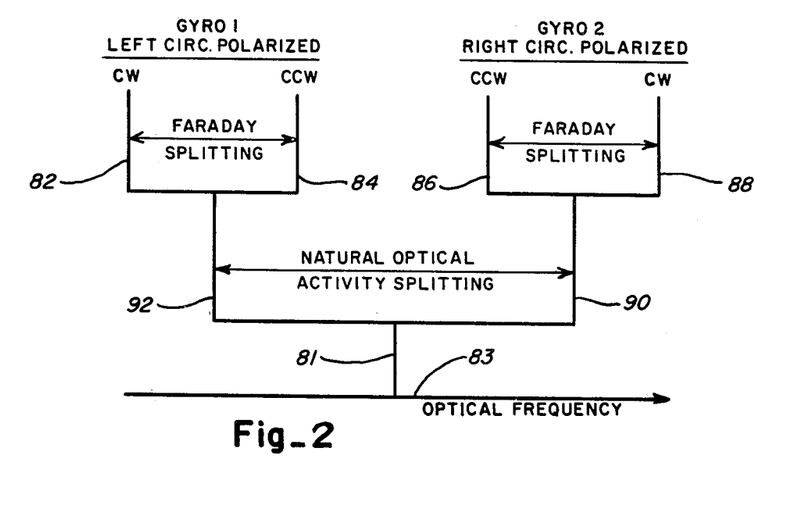
FIG. 2 illustrates the frequency splitting between each mode of a multi-oscillator ring laser gyroscope.

FIG. 2 illustrates how reciprocally and nonreciprocally anisotropic elements result in frequency separation between the four resonating modes in the ring laser cavity. In frequency space where increasing optical frequency is represented by line 83, line 81 represents the resonant frequency of the ring laser cavity. The reciprocally anisotropic dispersion element 26 (natural optical activity crystal rotator) in the ring laser path causes frequency splitting between left and right circularly polarized light as represented by lines 92 and 90 respectively. Furhter frequency splitting of the four resonating modes in the gyro cavity is accomplished by nonreciprocally anisotropic dispersion (Faraday splitting) in the plasma with the magnetic field of element 28 which causes clockwise and counterclockwise polarized light waves to experience different optical indices. Lines 82 and 84 represent the results of Faraday splitting of the left circularly polarized counterrotating waves represented by line 92. In the same manner lines 86 and 88 show the effects of Faraday splitting on right circularly polarized counterrotating light waves represented by line 90. At this point it should be mentioned that lines 82 and 88 represent frequencies of clockwise rotating waves. The lower and upper limits of the frequency spectrum in a four mode gyro will travel in the same direction in the laser cavity. If the magnetic field polarity is reversed in elements 26, the direction of the frequency extremes will be reversed.

As the ring laser system is rotated about an axis perpendicular to the plane of the laser path in the counterclockwise direction, frequencies 82 and 88 will increase while frequencies 84 and 86 will decrease. Because gyro output is a function of the separation between the frequencies of clockwise and counterclockwise rotating beams in the laser cavity, output from gyro 1 will decrease while the output from gyro 2 will increase. Conversely, if the laser system is rotated in a clockwise direction the outputs from gyros 1 and 2 will increase and decrease respectively.

Figure 3:
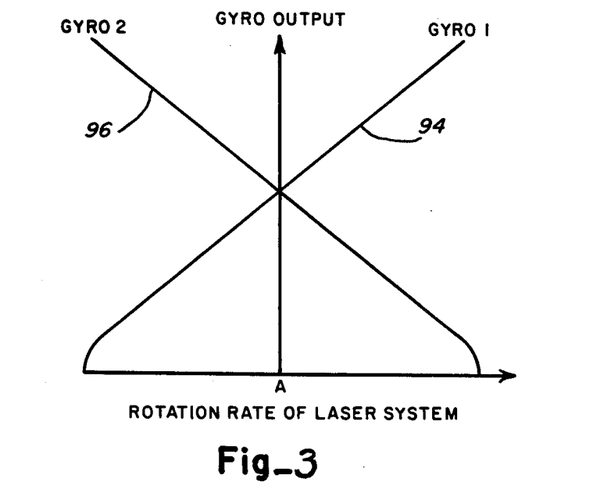
FIG. 3 is a graph showing how the output signals of the right circularly polarized and left circularly polarized signals are combined to produce a usable rotation rate reading.

FIG. 3 illustrates gyro output variation as a function of rotation rate of the ring laser system. Line 94 and 96 represent output for gyros 1 and 2 respectively as a function of system rotation in inertial space. The output signals from one gyro are subtracted from output signals of the other gyro and processed in logic circuitry 54 of FIG. 1 to provide a linear net output and a doubled scale factor for system rotation. Point A on FIG. 3 represents zero rotation for the laser system where the outputs of both gyros 1 and 2 are approximately equal.

FIGS. 4, 4A, 4B, 5, 5A, 5B, 6, 6A, 6B, 7, 7A, 7B, 8, 8A, 8B, 9, 9A and 9B are included herein to compare this invention with prior art apparatus and to define the upper and lower limits of the intensity of the magnetic field applied by coils 28 to the gain medium in this invention, such range of intensities being a principal point of novelty.

Figure 4:
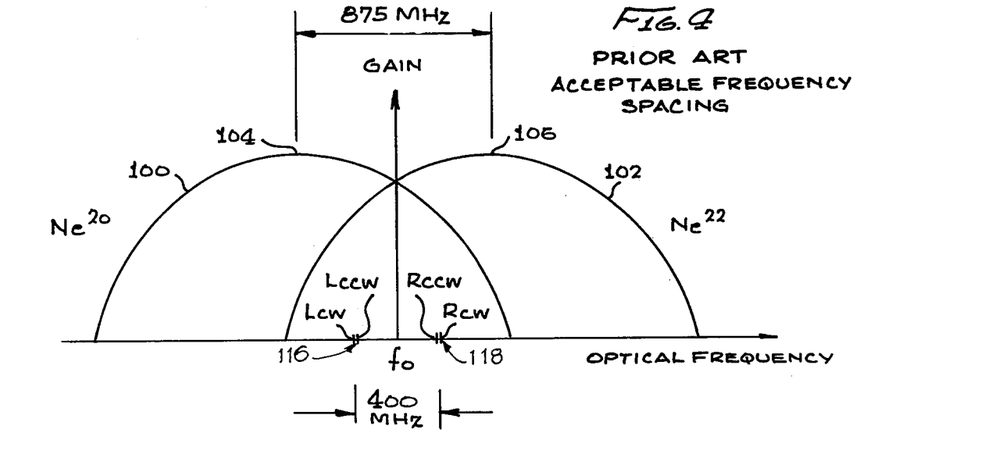
FIG. 4 shows separate gain vs. frequency curves of each isotope in a dual isotope gas laser plasma, together, with acceptable laser wave frequency separation according to the prior art.
Figure 4A:
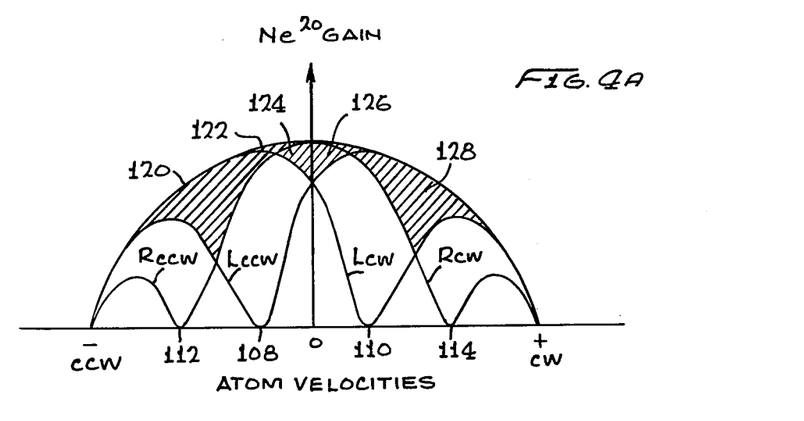
FIG. 4A shows a gain vs. atom velocity curve of the isotope corresponding to the left curve of FIG. 4, showing the depletion of atoms of that isotope caused by lasing of the four modes.
Figure 4B:
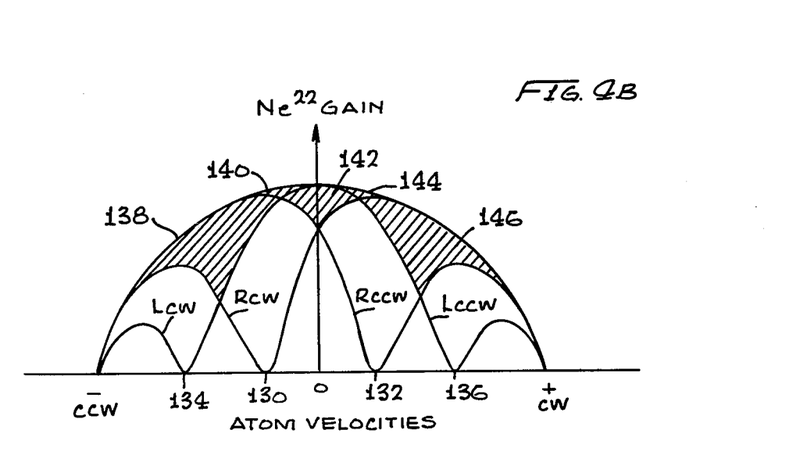
FIG. 4B shows a gain vs. atom velocity curve of the isotope corresponding to the right curve of FIG. 4, showing the depletion of atoms of that isotope caused by lasing of the four modes.
Figure 5:
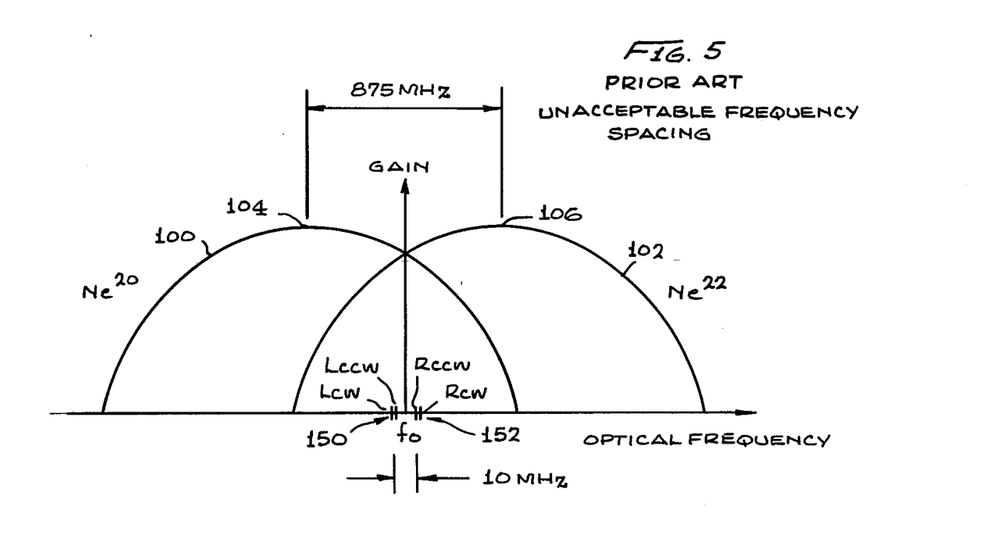
FIG. 5 shows separate gain vs. frequency curves of each isotope in a dual isotope in a dual isotope gas laser plasma, together with unacceptable laser wave frequency separation according to the prior art.
Figure 5A:
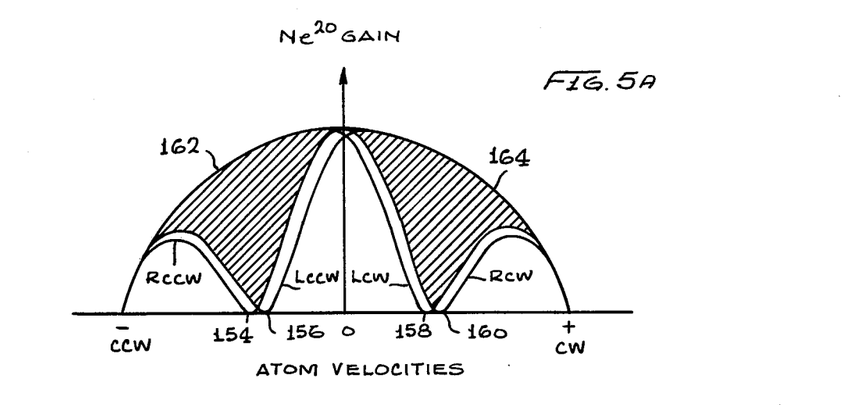
FIG. 5A shows a gain vs. atom velocity curve of the isotope corresponding to the left curve of FIG. 5, showing the depletion of atoms of that isotope caused by lasing of the four modes.
Figure 5B:
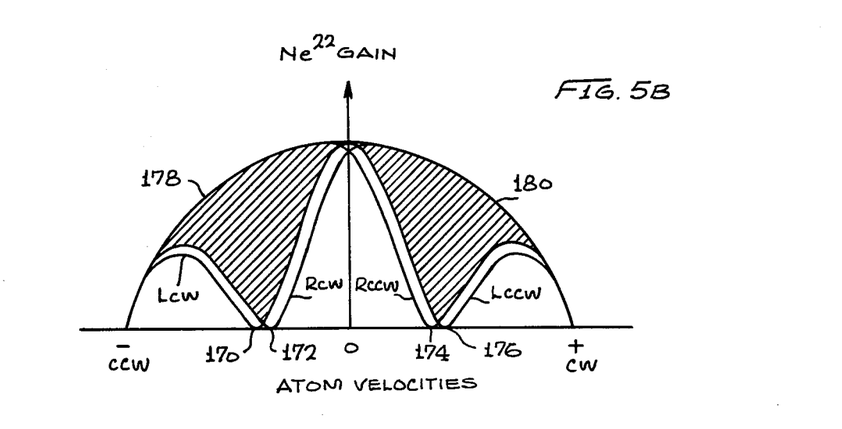
FIG. 5B shows a gain vs. atom velocity curve of the isotope corresponding to the right curve of FIG. 5, showing the depletion of atoms of that isotope caused by lasing of the four modes.

FIGS. 4, 4A, 4B, 5, 5A, 5B, 6, 6A, 6B refer to prior art mechanisms. FIGS. 4, 4A, 4B, 5, 5A, 5B, for example, could correspond to the operation of the apparatus of U.S. Pat. Nos. 3,741,657 and 4,006,989 with FIGS. 4, 4B, 4B representing proper operation with a long crystal and adequate frequency separation of the modes to avoid hole burning. FIGS. 5, 5A, 5B is an inoperative version of such apparatus where a small crystal is used and the frequency separation of the modes due to natural optical activity splitting has been reduced from the order of 400 Mhz to 10 Mhz. 10 Mhz was chosen to compare such apparatus to the apparatus of this invention which does have a natural optical activity splitting on the order of 10 Mhz while still avoiding hole burning.

Figure 6:
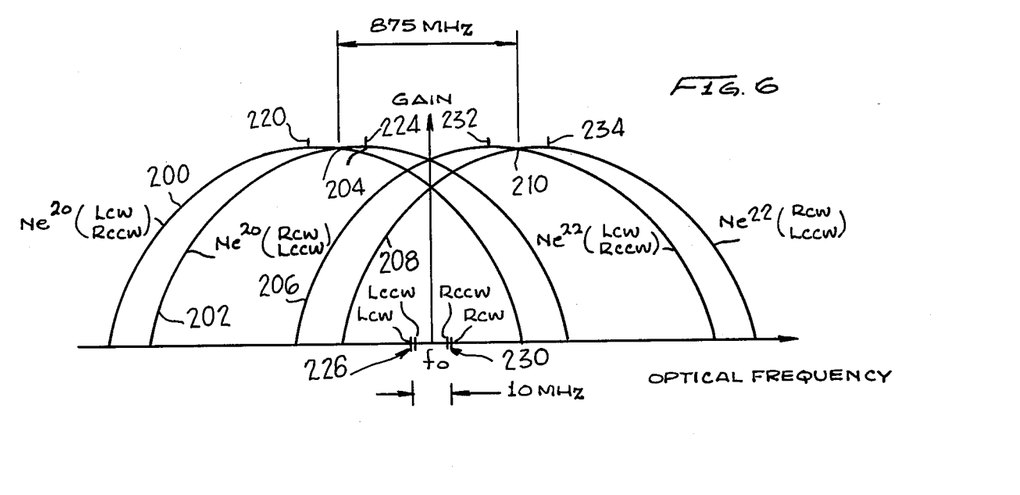
FIG. 6 shows separate gain vs. frequency curves for each isotope in a dual isotope gas laser plasma, showing an insufficient amount of Zeeman frequency splitting, according to the prior art.
Figure 6A:
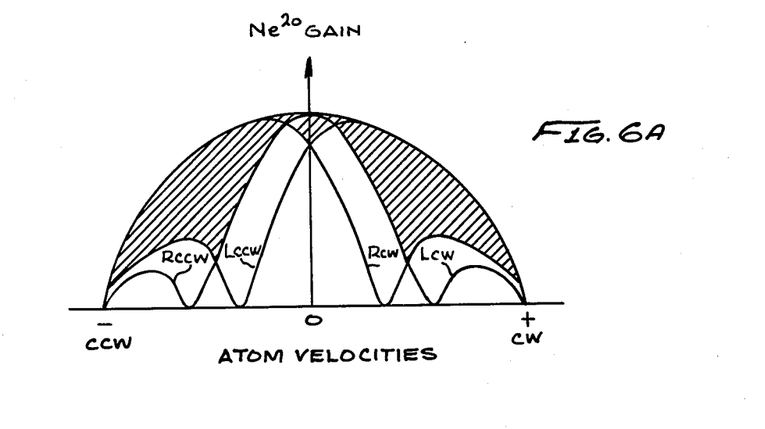
FIG. 6A shows a gain vs. atom velocity curve of the isotope corresponding to the left curves of FIG. 6, showing the depletion of atoms of that isotope caused by lasing of the four modes.
Figure 6B:
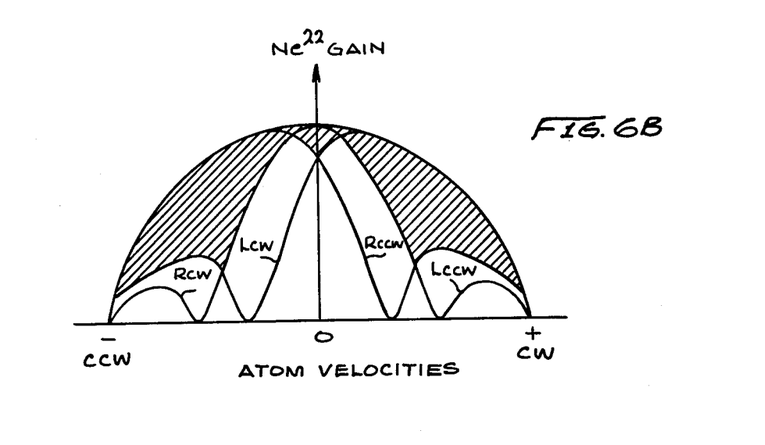
FIG. 6B shows a gain vs. atom velocity curve of the isotope corresponding to the right curves of FIG. 6, showing the depletion of atoms of that isotope caused by lasing of the four modes.

FIGS. 6, 6A, 6B corresponds to the apparatus of this invention that the intensity of the magnetic field applied to the gain medium is far too low. For example, in U.S. Pat. No. 3,973,851 the field was less than one Gauss. Aside from the fact that the field intensity is too low to prevent hole burning, it is also so low that the earth's magnetic field would interfere with its operation for its intended purpose which is to equalize the gain between clockwise and counterclockwise propagation.

Figure 7:
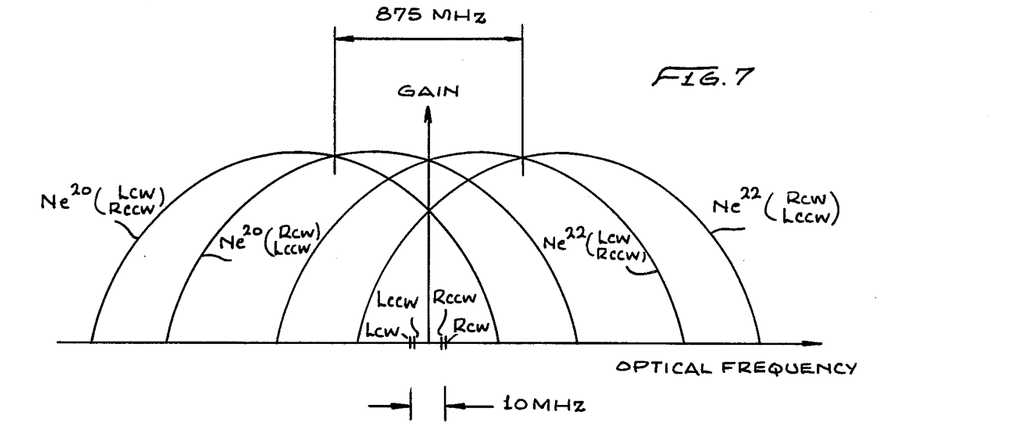
FIG. 7 shows separate gain vs. frequency curves for each isotope in a dual isotope gas laser plasma, wherein the magnetic field intensities in the two gain sections are aiding, showing a proper magnitude of Zeeman frequency splitting, according to this invention.
Figure 7A:
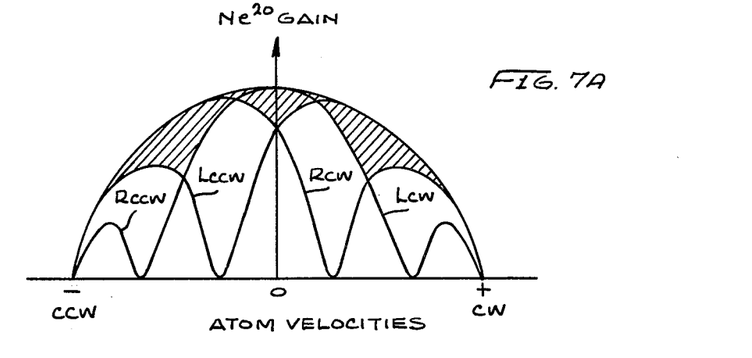
FIG. 7A shows a gain vs. atom velocity curve of the isotope corresponding to the left curves of FIG. 7, showing the depletion of atoms of that isotope caused by lasing of the four modes.
Figure 7B:
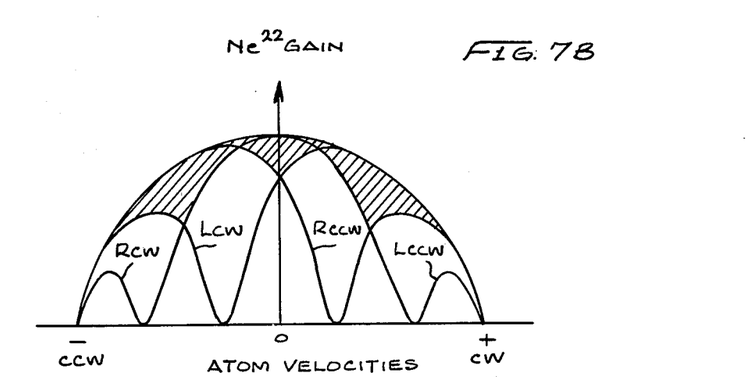
FIG. 7B shows a gain vs. atom velocity curve of the isotope corresponding to the right curves of FIG. 7, showing the depletion of atoms of that isotope caused by lasing of the four modes.

FIGS. 7, 7A, 7B correspond to the proper operation of the apparatus of this invention. Note in FIGS. 9A, 9B, the region of competition for atoms, shown shaded in the figures, is minimized.

Figure 8:
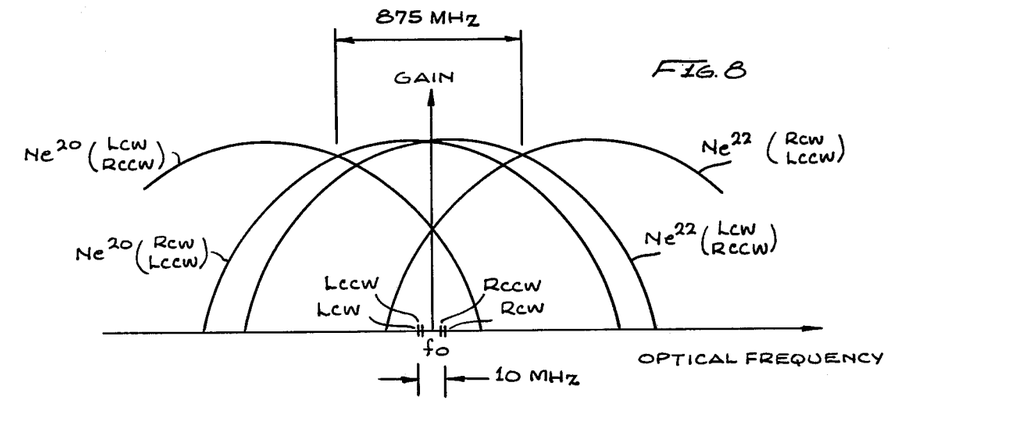
FIG. 8 shows separate gain vs. frequency curves for each isotope in a dual isotope gas laser plasma, showing the effect of an excess of Zeeman frequency splitting.
Figure 8A:
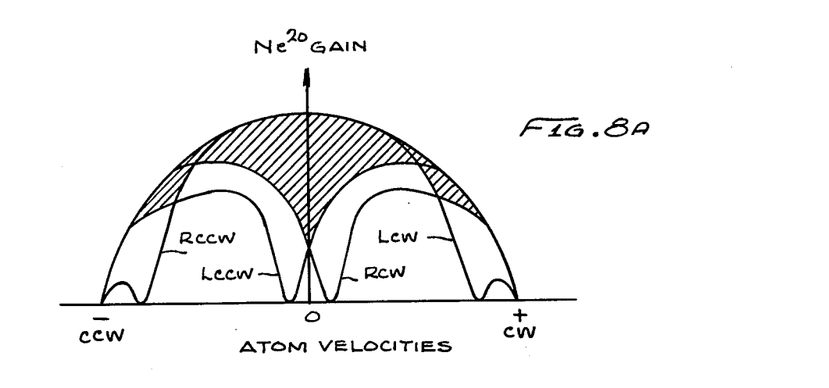
FIG. 8A shows a gain vs. atom velocity curve of the isotope corresponding to the left curves of FIG. 8, showing the depletion of atoms of that isotope caused by lasing of the four modes.
Figure 8B:
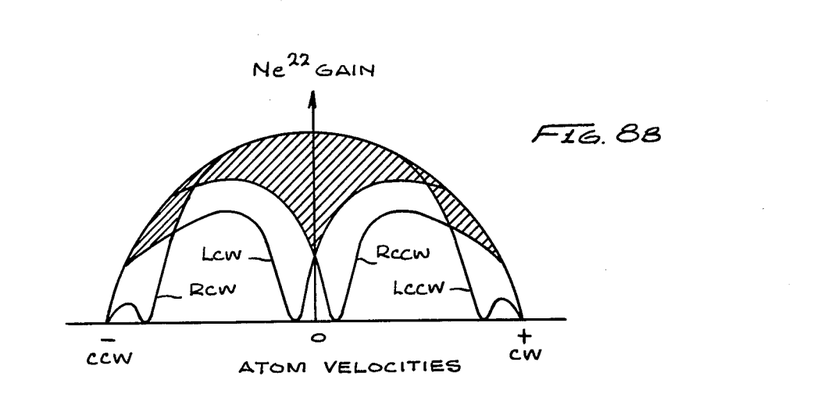
FIG. 8B shows a gain vs. atom velocity curve of the isotope corresponding to the right curves of FIG. 8, showing the depletion of atoms of that isotope caused by lasing of the four modes.

FIGS. 8, 8A, 8B corresponds to the apparatus of this invention except that the intensity of the magnetic field is far too high.

Thus, by comparing the figures, the range of acceptable field intensity to produce a Zeeman effect of appropriate magnitude to allow relatively small natural optical activity splitting without hole burning may be discerned.

Zeeman splitting, as described in *Fundamentals of Optics,* supra, results in each gain vs. optical frequency curve of FIGS. 4, and 5 to be split into two curves shifted in frequency space as shown in FIGS. 6, 7 and 8.

The magnetic field elements 28 cause the light emitting atoms in the laser gain plasma to be oriented such that any given atom may emit by stimulated emission a right circularly polarized light wave in one direction or a left circularly polarized light wave in the opposite direction.

FIGS. 4, 5, 6, 7, 8 and 9 show typical plots of gain vs. optical frequency for the isotopes neon 20 and neon 22. Obviously if other elements or isotopes were used, their frequency range would be different. Actually these curves are only the portion of a normal distribution curve, where the gain exceeds one, and the laser will oscillate.

FIGS. 4A, 5A, 6A, 7A, 8A and 9A are gain vs. atom velocity distribution for neon 20 in the clockwise (+) and counterclockwise (−) directions of the laser path. The graphs show the total available atoms as a function of velocity and how the various optical wave modes deplete and compete for the various available velocities. The shaded region shows where competition occurs, and the dips in the curves demonstrate the "holes" which are "burned" in the distribution by the four modes of optical wave propagation.

FIGS. 4B, 5B, 6B, 7B, 8B and 9B are the corresponding gain vs. atom velocity distribution for neon 22.

FIGS. 4, 4A, 4B and 7, 7A, 7B and 9, 9A, 9B situations where hole burning is avoided. The remaining figures show inoperative situations because of hole burning.

FIGS. 4, 4A, 4B correspond to the prior art without Zeeman effect. FIGS. 7, 7A, 7B, 9, 9A, 9B correspond to the apparatus of this invention.

Consider now the prior art represented by FIGS. 4, 4A, 4B.

Curves 100, 102 are gain vs. optical frequency curves for neon 20 and neon 22, respectively. The maximum gains for these two gases occur 875 Mhz apart, and the laser cavity is tuned to the mid frequency $f_o$ between those points 104, 106. The natural optical activity splitting must be large. Typically it is about 400 Mhz, and it must be larger than about 200 Mhz. The Faraday separation between clockwise and counterclockwise propagating optical waves is on the order of 0.4 Mhz. Note in U.S. Pat. Nos. 3,741,657 and 4,006,989 the frequency splitting is about 200 Mhz, the quartz is about 4 mm long and the field strength is 2000 Gauss. FIGS. 4, 4A, 4B show operation where the reciprocal frequency splitting is 400 Mhz. The frequencies are labeled on the abscissa wherein "L" means left polarized, "R" means right polarized, "CW" means clockwise, and "CCW" means counterclockwise. The separation of $R_{cw}$ and $R_{ccw}$, and the separation of $L_{cw}$ and $L_{ccw}$ are exaggerated.

Turning now to FIG. 4A, it is seen that the available velocities depleted by the four modes are sufficiently separated that they do not substantially complete for atoms. The "holes" 108, 110, 112, 114 do not substantially overlap. The velocity at points 108, 110 is proportional to the difference in frequency between that of point 104 (FIG. 4) and points 116. The velocity at points 112, 114 is proportional to the difference in frequency between that of point 109 and points 118. The regions of competition for atoms is minimal as represented by the shaded zones 120, 122, 124, 126, 128.

FIG. 4B is a similar graph for neon 22. Note that the hole positions are identical, but they correspond to different modes because the frequencies of 116, 118 are less than that of point 106. The velocity at points 130, 132 is proportional to the difference in frequency between that of point 106 and points 116. The regions of competition for atoms is minimal as represented by the shaded zones 138, 140, 142, 144, 146.

Thus, the apparatus used for FIGS. 4, 4A, 4B is operative to minimize hole burning, and all four modes will lase. To achieve this compensation, however, the crystal is relatively long and the magnetic field is very strong. At such high fields (1000–2000 Gauss), field control is very difficult.

If the crystal were shortened in the apparatus corresponding to FIGS. 4, 4A, 4B, to provide a natural optical activity splitting of, for example, only 10 Mhz (as in this invention), the non-reciprocal Faraday separation could not occur in the crystal because the crystal would be too short (on the order of 0.4 mm) to concentrate sufficient magnetic field intensity in the crystal. An external Faraday section would be needed to obtain even minimal non-reciprocal separation. FIGS. 5, 5A, 5B correspond to such a situation.

In FIG. 5, the difference between frequencies 150 and 152 is on the order of 10 Mhz. The distance from the frequency of point 104 and that of points 150, 152 are almost the same, i.e., 432.5 Mhz and 442.5 Mhz. Thus, the "holes" 154 and 156, and the holes 158, 160 are almost on top of each other in FIG. 5A for neon 20. The competition for atoms between $R_{ccw}$ and $L_{ccw}$ modes and between $L_{cw}$ and $R_{cw}$ modes is very strong, and only one mode in each pair will lase. The shaded areas 162, 164 representing competition between two modes, is very great.

Similarly, the difference between the frequency corresponding to point 106 and that of points 150, 152 are also 442.5 Mhz and 432.5 Mhz, and hole burning occurs. Notice that holes 170, 172 and 174, 176 are almost on top of each other. The $R_{ccw}$ and $L_{ccw}$ modes in neon 22 compete for atoms as shown by the shaded area 180. The $L_{cw}$ and $R_{cw}$ modes also compete for atoms as shown by the shaded area 178. Only one mode of each pair will lase.

Keeping the crystal short and the Faraday field as in FIGS. 5, 5A, 5B, but applying only a small amount of magnetic field to the gain medium produces Zeeman splitting as shown in FIG. 6. The neon 20 gain vs. frequency curve of FIGS. 4 and 5 is shifted up and down in frequency a small amount to produce two gain vs. frequency curves 200, 202 symmetrical about the crossover point 204. Similarly, the neon 22 gain vs. frequency curve of FIGS. 4 and 5 is shifted up and down in frequency a small amount to produce two gain vs. frequency curves 206, 208 symmetrical about crossover point 210. The crossover points 204, 210 are 875 Mhz apart and symmetrically positioned relative to $F_o$. The amount of Zeeman shift is 1.8 Mhz per Gauss of applied field. Note that with 1 Gauss maximum of U.S. Pat. No. 3,973,851, the amount of Zeeman shift would be negligible, and it likely would not be seen if drawn to scale in FIG. 6. Curves 200 and 206, which have shifted downward, describe the gain vs. frequency for the $L_{cw}$ and $R_{ccw}$ modes. Curves 202 and 208, which have shifted upward, describe the gain vs. frequency for the $R_{cw}$ and $L_{ccw}$ modes.

FIG. 6A is a graph of the atom velocity distribution of neon 20. The difference in frequency between that of peak point 220 and the frequency of 226 is too close to the difference in frequency between that of peak point 224 and that of 230. Consequently "holes" 240, 242 and holes 244, 246 are too close together, and only two modes will oscillate.

FIG. 6B shows the corresponding velocity distribution for neon 22. The frequency difference between that of peak point 232 and 226 is too close to the difference between that of peak point 234 and 230. The coupling between modes is excessive, as shown by the cross-hatched areas of FIGS. 6A and 6B, and only two modes will lase.

FIGS. 7, 7A, 7B show conditions for the optimum adjustment of field intensity according to this invention. In FIGS. 7A, 7B notice that the region of coupling of the modes, as indicated by the shaded regions, is minimized. The "holes" of the four modes are sufficiently separated so that they all will lase. Note that the competing regions for gain atoms are substantially the same as in FIGS. 4A, 4B.

FIGS. 8, 8A, 8B show conditions wherein the apparatus of this invention is using an excessive field intensity. Note that the $L_{ccw}$ and $R_{cw}$ "holes" in FIG. 8A are too close together, they are closely coupled as indicated by the large hatched area, and any one of those two modes will lase. Similarly in FIG. 8B, the $L_{cw}$ and $R_{ccw}$ "holes" are too close together, and they are closely coupled as indicated by the large hatched area, and only one of the two modes will lase.

With the fields of coils 28 aiding as shown, the fields not only produce Zeeman effect, but they also produce sufficient non-reciprocal anisotropic a Faraday effect without additional Faraday cells.

Figure 9:
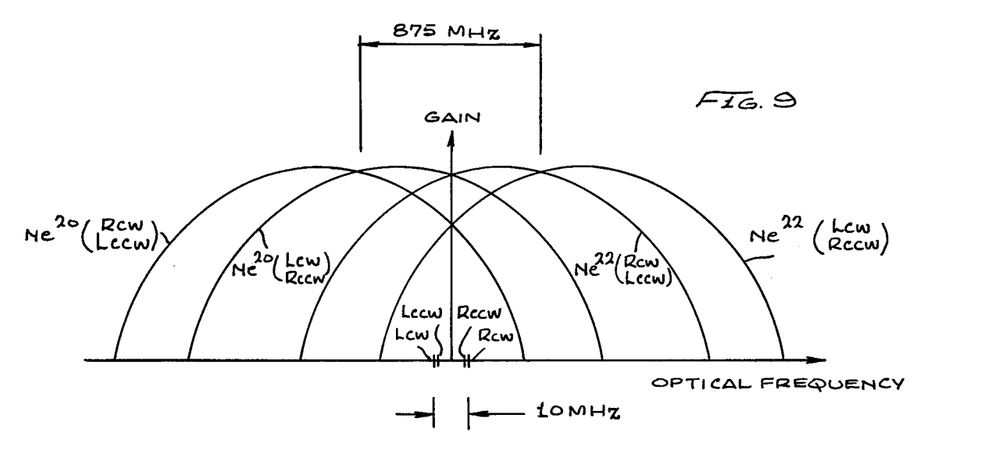
FIG. 9 is identical to FIG. 7 except that the field intensities in the two gain sections are opposing.
Figure 9A:
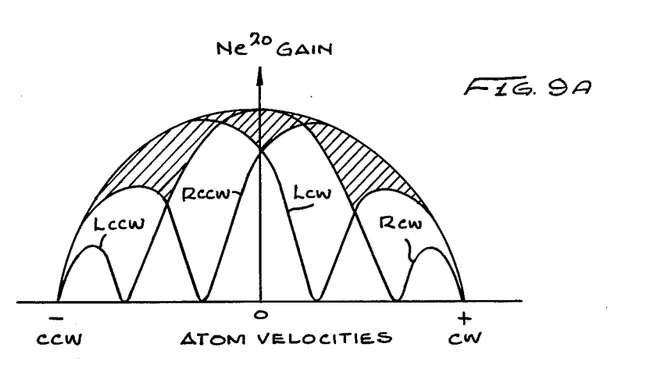
FIG. 9A shows a gain vs. atom velocity curve of the isotope corresponding to the left curves of FIG. 9, showing the depletion of atoms of that isotope caused by lasing of the four modes.
Figure 9B:
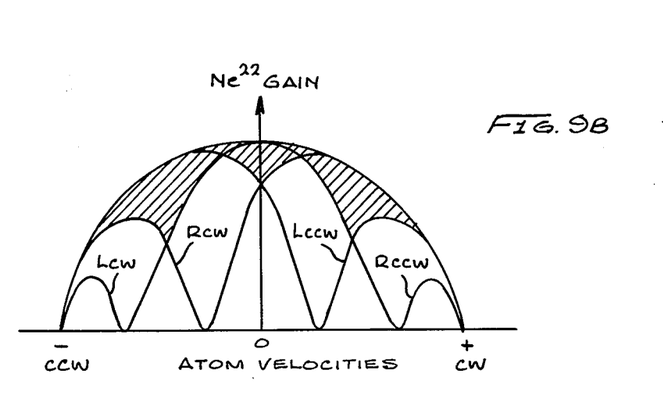
FIG. 9B shows a gain vs, atom velocity curve of the isotope corresponding to the right curves of FIG. 6, showing the depletion of atoms of that isotope caused by lasing of the four modes.

With the fields of coils 28 in the two gain sections opposing, the Faraday effect is minimized, and if the two gain sections are substantially identical, and if the field intensities are substantially identical, the Faraday effect is canceled, and an additional non-reciprocal anisotropic element must appear in the loop. Note, however, that the Zeeman effect is unchanged from FIGS. 7, 7A, 7B except that the modes are interchanged as shown in FIGS. 9, 9A, 9B.

Thus, the magnetic field intensity applied to the gain medium, in accordance with this invention should be optimized to minimize the coupling between modes. With 10 Mhz natural optical activity splitting, the intensity is on the order of 100 Gauss.

The minimum allowable magnetic field intensity is above the value where the $R_{cw}$ and $L_{cw}$ mode pair and the $R_{ccw}$ and $L_{ccw}$ mode pair are sufficiently coupled to extinguish one mode of each pair.

The maximum allowable magnetic field intensity is below the value where the $L_{ccw}$ and $R_{cw}$ mode pair and the $R_{ccw}$ and $L_{cw}$ mode pair are sufficiently coupled to extinguish one mode of each pair.

Other embodiments and modifications to this ring laser system are within the scope of this invention. For example, other means of output detection and information processing may be employed, the number of reflective elements in the ring laser path may be varied, and the magnetic field or fields for Faraday and/or Zeeman splitting may be implemented using a permanent magnet.

I claim:

1. A four mode ring laser gyro comprising:
   reflective means for at least partly confining a pair of right-circularly-polarized clockwise and counter-clockwise propagating radiant energy waves and a pair of left-circularly-polarized clockwise- and counter-clockwise- propagating radiant energy waves in a closed loop path;
   an enclosure enclosing said closed loop path;
   at least two gas isotopes comprising a gain medium within said enclosure;
   means for optically pumping said gain medium in at least one gain section of said path;
   reciprocally anisotropic dispersion means in said path for separating the frequency of right-circularly-polarized radiant energy waves from the frequency of left-circularly-polarized radiant energy waves by a chosen predetermined value;
   means for applying as a function of said predetermined frequency separation a substantially uniform magnetic field in the direction of said path to all of said gain sections, the intensity of said magnetic field in each gain section being at a value to separate the gain curves of each said isotope into two gain curves separated by an amount to minimize hole burning competition for said predetermined frequency separation.

2. Apparatus as recited in claim 1 wherein the frequencies of said waves propagating in one direction in said path increase while the frequencies of waves traveling in the opposite direction decrease as said ring laser is rotated about an axis;
   means for detecting the different polarized and different propagating modes of said waves to produce signals representative of said different modes of said waves;
   means for combining said signals to produce beat frequency signals;
   means for detecting said beat frequency signals; and
   means for producing signals which are a measure of the rotational displacement and rotational displacement rate of said laser about said axis.

3. Apparatus as recited in claim 1 and further comprising additional means in said loop for producing nonreciprocal anisotropic dispersion of frequency between said clockwise and counterclockwise propagating modes.

4. Apparatus as recited in claim 3 in which said non-reciprocal anisotropic dispersion means is a Faraday rotator.

5. Apparatus as recited in claim 3 in which said isotopes are neon 20 and neon 22.

6. Apparatus as recited in claim 1 in which said reciprocally anisotropic dispersion means is a material having natural optical activity splitting.

7. Apparatus as recited in claim 6 in which said reciprocally anisotropic dispersion means is a quartz crystal.

8. Apparatus as recited in claim 1 in which there are two symmetrically positioned gain sections, and said gain sections are optically pumped by applying a voltage between the two ends of each of said sections.

9. Apparatus as recited in claim 8 in which the polarities of said magnetic fields applied to the gain medium in both said gain sections are in the same direction around said loop.

10. Apparatus as recited in claim 8 in which the polarities of said magnetic fields applied to the gain medium in both said gain sections are in opposite direction around said loop.

11. Apparatus as recited in claim 10 in which said gain sections are substantially identical, and the magnetic field intensities applied to said gain sections are substantially the same, and further comprising means in said loop for producing non-reciprocal anisotropic dispersion of frequency between said clockwise and counterclockwise propagating modes.

12. Apparatus as recited in claim 9 in which said non-reciprocal anisotropic dispersion means is a Faraday rotator, in which said reciprocally anisotropic dispersion means is a quartz crystal, and said isotopes are neon 20 and neon 22.

13. Apparatus as recited in claim 12 in which said reciprocal optical dispersion may be as small as ten Mhz.

14. Apparatus as recited in claim 13 in which the total intensity of said magnetic fields is on the order of 100 Gauss.

15. Apparatus as recited in claim 14 wherein the frequencies of said waves propagating in one direction in said path increase while the frequencies of waves traveling in the opposite direction decrease as said ring laser is rotated about an axis; p1 means for detecting the different polarized and different propagating modes of said waves to produce signals representative of said different modes of said waves;

means for combining said signals to produce beat frequency signals;

means for detecting said beat frequency signals; and means for producing signals which are a measure of the rotational displacement and rotational displacement rate of said laser about said axis.

* * * * *